US006976158B2

(12) United States Patent
Catherwood et al.

(10) Patent No.: US 6,976,158 B2
(45) Date of Patent: Dec. 13, 2005

(54) REPEAT INSTRUCTION WITH INTERRUPT

(75) Inventors: Michael Catherwood, Pepperell, MA (US); Joseph W. Triece, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 693 days.

(21) Appl. No.: 09/870,451

(22) Filed: Jun. 1, 2001

(65) Prior Publication Data

US 2002/0194466 A1 Dec. 19, 2002

(51) Int. Cl.$^7$ .............................. G06F 9/32; G06F 9/44; G06F 9/48; G06F 13/32
(52) U.S. Cl. ...................... 712/241; 712/227; 712/230; 712/244; 712/241; 711/219; 710/266
(58) Field of Search .................. 712/227, 230, 712/241, 244, 245; 711/219; 710/266, 261

(56) References Cited

U.S. PATENT DOCUMENTS

| | | | |
|---|---|---|---|
| 3,771,146 A | 11/1973 | Cottton et al. ............... | 710/260 |
| 3,781,810 A | 12/1973 | Downing ................ | 340/172.5 |
| 3,886,524 A | 5/1975 | Appelt ....................... | 710/110 |
| 3,930,253 A | 12/1975 | Maida ........................ | 340/347 |
| 4,025,771 A | 5/1977 | Lynch et al. ............... | 708/521 |
| 4,074,353 A | 2/1978 | Woods et al. ............... | 710/264 |
| 4,090,250 A | 5/1978 | Carlson et al. ............. | 712/234 |
| 4,323,981 A | 4/1982 | Nakamura ................. | 364/749 |
| 4,379,338 A | 4/1983 | Nishitani et al. ........... | 708/552 |
| 4,398,244 A | 8/1983 | Chu et al. ................... | 364/200 |
| 4,408,274 A | 10/1983 | Wheatley et al. .......... | 364/200 |
| 4,451,885 A | 5/1984 | Gerson et al. ............. | 708/200 |
| 4,472,788 A | 9/1984 | Yamazaki ................... | 364/900 |
| 4,481,576 A | 11/1984 | Bicknell ..................... | 364/200 |
| 4,488,252 A | 12/1984 | Vassar ........................ | 364/748 |
| 4,511,990 A | 4/1985 | Hagiwara et al. ........... | 364/748 |
| 4,556,938 A | 12/1985 | Parker et al. ............... | 364/200 |
| 4,615,005 A | 9/1986 | Maejima et al. ............ | 713/601 |
| 4,626,988 A | 12/1986 | George ...................... | 364/200 |

(Continued)

FOREIGN PATENT DOCUMENTS

| | | | | |
|---|---|---|---|---|
| EP | 0 554 917 A2 | 8/1993 | ............. | G06F/9/26 |
| EP | 0 855 643 A1 | 7/1998 | ............. | G06F/9/30 |

(Continued)

OTHER PUBLICATIONS

Moon B I et al.: "A 32–bit RISC Microprocessor with DSP Functionality: Rapid Prototyping" IEICE Transactions on Fundamentals of Electronics, Communications and Computer Sciences, Institute of Electronics and Information and Comm. Eng. Tokyo, JP, vol. E84–A no. 5, pp. 1339–1347, XP001060025 ISSN: 0916–8508, May 2001.

(Continued)

Primary Examiner—Daniel H. Pan
(74) Attorney, Agent, or Firm—Baker Botts L.L.P.

(57) ABSTRACT

A processor for processing an interruptible repeat instruction is provided. The repeat instruction may include an immediate operand specifying a loop count value corresponding to the number of times that the loop is to be repeated. Alternatively, the repeat instruction may include an address of a register which holds the loop count value. The instruction immediately following the repeat instruction is the target instruction for repetition. The processing includes repeating execution of the target instruction according to the loop count value in a low processor cycle overhead manner. The processing may also include handling interrupts during repeat instruction processing in a low-overhead manner during the initial call of the interrupt service routine as well as upon returning from the interrupt service routine.

15 Claims, 7 Drawing Sheets

U.S. PATENT DOCUMENTS

| | | | |
|---|---|---|---|
| 4,709,324 A | 11/1987 | Kloker | 364/200 |
| 4,730,248 A | 3/1988 | Watanabe et al. | 364/200 |
| 4,742,479 A | 5/1988 | Kloker et al. | 364/746 |
| 4,768,149 A * | 8/1988 | Konopik et al. | 710/47 |
| 4,779,191 A | 10/1988 | Greenblatt | 711/2 |
| 4,782,457 A | 11/1988 | Cline | 364/715.04 |
| 4,800,524 A | 1/1989 | Roesgen | 364/900 |
| 4,807,172 A | 2/1989 | Nukiyama | 364/715.08 |
| 4,829,420 A | 5/1989 | Stahle | 364/200 |
| 4,829,460 A | 5/1989 | Ito | 364/715.08 |
| 4,839,846 A | 6/1989 | Hirose et al. | 364/748 |
| 4,841,468 A | 6/1989 | Miller et al. | 708/625 |
| 4,872,128 A | 10/1989 | Shimizu | 364/715.08 |
| 4,882,701 A | 11/1989 | Ishii | 364/900 |
| 4,926,371 A | 5/1990 | Vassiliadis et al. | 708/628 |
| 4,941,120 A | 7/1990 | Brown et al. | 364/748 |
| 4,943,940 A | 7/1990 | New | 364/748 |
| 4,959,776 A | 9/1990 | Deerfield et al. | 364/200 |
| 4,977,533 A | 12/1990 | Miyabayashi et al. | 364/726 |
| 4,984,213 A | 1/1991 | Abdoo et al. | 365/230.03 |
| 5,007,020 A | 4/1991 | Inskeep | 364/900 |
| 5,012,441 A | 4/1991 | Retter | 364/900 |
| 5,032,986 A | 7/1991 | Pathak et al. | 364/200 |
| 5,034,887 A | 7/1991 | Yasui et al. | 364/200 |
| 5,038,310 A | 8/1991 | Akagiri et al. | 364/715.04 |
| 5,040,178 A | 8/1991 | Lindsay et al. | 371/21.5 |
| 5,056,004 A | 10/1991 | Ohde et al. | 264/200 |
| 5,099,445 A | 3/1992 | Studor et al. | 364/715.08 |
| 5,101,484 A | 3/1992 | Kohn | 395/375 |
| 5,117,498 A | 5/1992 | Miller et al. | 395/775 |
| 5,121,431 A | 6/1992 | Wiener | 713/174 |
| 5,122,981 A | 6/1992 | Taniguchi | 364/748 |
| 5,155,823 A | 10/1992 | Tsue | 395/400 |
| 5,177,373 A | 1/1993 | Nakamura | 307/265 |
| 5,197,023 A | 3/1993 | Nakayama | 364/748 |
| 5,197,140 A | 3/1993 | Balmer | 395/400 |
| 5,206,940 A | 4/1993 | Murakami et al. | 395/400 |
| 5,212,662 A | 5/1993 | Cocanougher et al. | 364/748 |
| 5,239,654 A | 8/1993 | Ing-Simmons et al. | 395/800 |
| 5,276,634 A | 1/1994 | Suzuki et al. | 364/748 |
| 5,282,153 A | 1/1994 | Bartkowiak et al. | 364/716 |
| 5,327,543 A | 7/1994 | Miura et al. | 395/375 |
| 5,327,566 A | 7/1994 | Forsyth | 395/775 |
| 5,375,080 A | 12/1994 | Davies | 364/736.5 |
| 5,379,240 A | 1/1995 | Byrne | 364/715.08 |
| 5,386,563 A | 1/1995 | Thomas | 395/650 |
| 5,392,435 A | 2/1995 | Masui et al. | 395/725 |
| 5,418,976 A | 5/1995 | Iida | 395/800 |
| 5,422,805 A | 6/1995 | McIntyre et al. | 708/625 |
| 5,432,943 A | 7/1995 | Mitsuishi | 395/775 |
| 5,448,703 A | 9/1995 | Amini et al. | 395/290 |
| 5,448,706 A | 9/1995 | Fleming et al. | 395/421.07 |
| 5,450,027 A | 9/1995 | Gabara | 326/98 |
| 5,463,749 A | 10/1995 | Wertheizer et al. | 395/437 |
| 5,469,377 A | 11/1995 | Amano | 364/748 |
| 5,471,600 A | 11/1995 | Nakamoto | 395/405 |
| 5,497,340 A | 3/1996 | Uramoto et al. | 364/745 |
| 5,499,380 A | 3/1996 | Iwata et al. | 395/800 |
| 5,504,916 A | 4/1996 | Murakami et al. | 395/800 |
| 5,517,436 A | 5/1996 | Andreas et al. | 364/736 |
| 5,525,874 A | 6/1996 | Mallarapu et al. | 318/254 |
| 5,548,544 A | 8/1996 | Matheny et al. | 364/745 |
| 5,561,384 A | 10/1996 | Reents et al. | 327/108 |
| 5,561,619 A | 10/1996 | Watanabe et al. | 364/736.5 |
| 5,564,028 A * | 10/1996 | Swoboda et al. | 712/227 |
| 5,568,380 A | 10/1996 | Broadnax et al. | 364/184 |
| 5,568,412 A | 10/1996 | Han et al. | 364/748 |
| 5,596,760 A | 1/1997 | Ueda | 395/588 |
| 5,600,813 A | 2/1997 | Nakagawa et al. | 395/421.07 |
| 5,611,061 A | 3/1997 | Yasuda | 395/591 |
| 5,619,711 A | 4/1997 | Anderson | 395/800 |
| 5,623,646 A | 4/1997 | Clarke | 395/560 |
| 5,638,524 A | 6/1997 | Kiuchi et al. | 395/375 |
| 5,642,516 A | 6/1997 | Hedayat et al. | 395/733 |
| 5,649,146 A | 7/1997 | Riou | 395/421.07 |
| 5,651,121 A | 7/1997 | Davies | 395/376 |
| 5,657,484 A | 8/1997 | Scarrá | 395/561 |
| 5,659,700 A | 8/1997 | Chen et al. | 395/421.07 |
| 5,682,339 A | 10/1997 | Tam | 364/715.08 |
| 5,689,693 A | 11/1997 | White | 395/565 |
| 5,694,350 A | 12/1997 | Wolrich et al. | 364/788 |
| 5,696,711 A | 12/1997 | Makineni | 364/748.03 |
| 5,701,493 A | 12/1997 | Jaggar | 395/734 |
| 5,706,460 A | 1/1998 | Craig et al. | 395/380 |
| 5,706,466 A | 1/1998 | Dockser | 395/452 |
| 5,715,470 A | 2/1998 | Asano et al. | 395/800 |
| 5,737,570 A | 4/1998 | Koch | 395/872 |
| 5,740,095 A | 4/1998 | Parant | 364/760 |
| 5,740,419 A | 4/1998 | Potter | 395/588 |
| 5,740,451 A | 4/1998 | Muraki et al. | 395/733 |
| 5,748,516 A | 5/1998 | Goddard et al. | 364/748.03 |
| 5,748,970 A | 5/1998 | Miyaji et al. | 395/733 |
| 5,764,555 A | 6/1998 | McPherson et al. | 364/748.03 |
| 5,765,216 A | 6/1998 | Weng et al. | 711/214 |
| 5,765,218 A | 6/1998 | Ozawa et al. | 711/219 |
| 5,774,711 A | 6/1998 | Henry et al. | 395/591 |
| 5,778,237 A | 7/1998 | Yamamoto et al. | 713/322 |
| 5,778,416 A | 7/1998 | Harrison et al. | 711/5 |
| 5,790,443 A | 8/1998 | Shen et al. | 364/746 |
| 5,808,926 A | 9/1998 | Gorshtein et al. | 364/748.11 |
| 5,812,439 A | 9/1998 | Hansen | 364/748.03 |
| 5,812,868 A | 9/1998 | Moyer et al. | 395/800.23 |
| 5,815,693 A | 9/1998 | McDermott et al. | 713/501 |
| 5,825,730 A | 10/1998 | Nishida et al. | 369/44.32 |
| 5,826,072 A | 10/1998 | Knapp et al. | 395/567 |
| 5,826,096 A | 10/1998 | Baxter | 395/800.24 |
| 5,828,875 A | 10/1998 | Halvarsson et al. | 395/588 |
| 5,862,065 A | 1/1999 | Muthusamy | 364/736.5 |
| 5,867,726 A | 2/1999 | Ohsuga et al. | 395/800.32 |
| 5,875,342 A | 2/1999 | Temple | 395/733 |
| 5,880,984 A | 3/1999 | Burchfiel et al. | 364/748.07 |
| 5,892,697 A | 4/1999 | Brakefield | 364/748.02 |
| 5,892,699 A | 4/1999 | Duncan et al. | 364/760.4 |
| 5,894,428 A | 4/1999 | Harada | 364/724.03 |
| 5,900,683 A | 5/1999 | Rinehart et al. | 307/126 |
| 5,909,385 A | 6/1999 | Nishiyama et al. | 364/760.03 |
| 5,917,741 A | 6/1999 | Ng | 364/748.03 |
| 5,918,252 A | 6/1999 | Chen et al. | 711/217 |
| 5,930,159 A | 7/1999 | Wong | 364/745.01 |
| 5,930,503 A | 7/1999 | Drees | 395/651 |
| 5,936,870 A | 8/1999 | Im | 364/745.03 |
| 5,937,199 A | 8/1999 | Temple | 395/335 |
| 5,938,759 A | 8/1999 | Kamijo | 712/209 |
| 5,941,940 A | 8/1999 | Prasad et al. | 708/523 |
| 5,943,249 A | 8/1999 | Handlogten | 364/748.02 |
| 5,944,816 A | 8/1999 | Dutton et al. | 712/215 |
| 5,951,627 A | 9/1999 | Kiamilev et al. | 708/404 |
| 5,951,679 A | 9/1999 | Anderson et al. | 712/241 |
| 5,974,549 A | 10/1999 | Golan | 713/200 |
| 5,978,825 A | 11/1999 | Divine et al. | 708/525 |
| 5,983,333 A | 11/1999 | Kolagotia et al. | 711/219 |
| 5,991,787 A | 11/1999 | Abel et al. | 708/400 |
| 5,991,868 A | 11/1999 | Kamiyama et al. | 712/32 |
| 5,996,067 A | 11/1999 | White | 712/224 |
| 6,009,454 A | 12/1999 | Dummermuth | 709/108 |
| 6,014,723 A | 1/2000 | Tremblay et al. | 711/1 |
| 6,018,757 A | 1/2000 | Wong | 708/525 |
| 6,026,489 A | 2/2000 | Wachi et al. | 712/241 |
| 6,044,392 A | 3/2000 | Anderson et al. | 708/551 |
| 6,044,434 A | 3/2000 | Oliver | 711/110 |
| 6,049,858 A | 4/2000 | Kolagotia et al. | 711/217 |

| | | | |
|---|---|---|---|
| 6,055,619 A | 4/2000 | North et al. | 713/36 |
| 6,058,409 A | 5/2000 | Kozaki et al. | 708/409 |
| 6,058,410 A | 5/2000 | Sharangpani | 708/551 |
| 6,058,464 A | 5/2000 | Taylor | 711/217 |
| 6,061,711 A | 5/2000 | Song et al. | 709/108 |
| 6,061,780 A | 5/2000 | Shippy et al. | 712/204 |
| 6,061,783 A | 5/2000 | Harriman | 712/224 |
| 6,076,154 A | 6/2000 | Van Eijndhoven et al. | 712/24 |
| 6,084,880 A | 7/2000 | Bailey et al. | 370/395 |
| 6,101,521 A | 8/2000 | Kosiec | 708/550 |
| 6,101,599 A | 8/2000 | Wright et al. | 712/228 |
| 6,115,732 A | 9/2000 | Oberman et al. | 708/625 |
| 6,128,728 A | 10/2000 | Dowling | 712/228 |
| 6,134,574 A | 10/2000 | Oberman et al. | 708/551 |
| 6,144,980 A | 11/2000 | Oberman | 708/627 |
| 6,145,049 A | 11/2000 | Wong | 710/267 |
| 6,181,151 B1 | 1/2001 | Wasson | 324/765 |
| 6,202,163 B1 | 3/2001 | Gabzdyl et al. | 713/324 |
| 6,205,467 B1 | 3/2001 | Lambrecht et al. | 709/108 |
| 6,209,086 B1 | 3/2001 | Chi et al. | 712/244 |
| 6,243,786 B1 * | 6/2001 | Huang et al. | 710/262 |
| 6,243,804 B1 | 6/2001 | Cheng | 712/228 |
| 6,260,162 B1 | 7/2001 | Typaldos et al. | 714/55 |
| 6,282,637 B1 | 8/2001 | Chan et al. | 712/223 |
| 6,292,866 B1 | 9/2001 | Zaiki et al. | 710/264 |
| 6,295,574 B1 | 9/2001 | MacDonald | 710/261 |
| 6,315,200 B1 | 11/2001 | Silverbrook et al. | 235/454 |
| 6,356,970 B1 | 3/2002 | Killian et al. | 710/269 |
| 6,377,619 B1 | 4/2002 | Denk et al. | 375/232 |
| 6,397,318 B1 | 5/2002 | Peh | 711/220 |
| 6,412,081 B1 | 6/2002 | Koscal et al. | 714/34 |
| 6,487,654 B2 | 11/2002 | Dowling | 712/244 |
| 6,523,108 B1 | 2/2003 | James et al. | 712/224 |
| 6,564,238 B1 | 5/2003 | Kim et al. | 708/513 |
| 6,633,970 B1 | 10/2003 | Clift et al. | 712/217 |
| 6,658,578 B1 | 12/2003 | Laurenti et al. | 713/324 |
| 6,681,280 B1 | 1/2004 | Miyake et al. | 710/261 |
| 6,694,398 B1 | 2/2004 | Zhao et al. | 710/260 |
| 6,728,856 B2 | 4/2004 | Grosbach et al. | 711/202 |
| 6,751,742 B1 | 6/2004 | Duhault et al. | 713/323 |
| 6,763,478 B1 | 7/2004 | Bui | 713/600 |
| 2002/0194466 A1 | 12/2002 | Catherwood et al. | 712/241 |
| 2003/0093656 A1 | 5/2003 | Masse et al. | 712/241 |

FOREIGN PATENT DOCUMENTS

| | | | |
|---|---|---|---|
| EP | 0 992 888 A | 12/2000 | |
| EP | 0 992 888 | 12/2000 | G06F/9/32 |
| EP | 0 992 889 A | 12/2000 | |
| EP | 0 992 889 | 12/2000 | G06F/9/32 |
| JP | 01037424 A | 2/1989 | H03M/1/82 |
| WO | 96/11443 | 4/1996 | G06F/15/78 |

OTHER PUBLICATIONS

Turley J: "Balancing Conflicting Requirements When Mixing RISC, DSPs" Computer Design, Pennwell Publ. Littleton, Massachusetts, IS, vol. 37, no. 10, pp. 46, 48, 50–53, XP000860706 ISSN:0010–4566, Oct. 1998.

Levy M: "Microprocessor and DSP Technologies Unite for Embedded Applications" EDN Electrical Design News, Cahners Publishing Co., Newton Massachusetts, US, no. Europe, pp. 73–74, 76, 78–80, XP000779113 ISSN: 0012–7515, Mar. 2, 1998.

Intel, Pentium Processor Family Developer's Manual, vol. 3: Architecture and Programming Manual, , pp. 3–1, 3–2, 3–15, 14–1 to 14–30, 18–7, and 25–289 to 25–292, 1995.

Intel, Embedded Intel486 Processor Family Developer's Maual, pp. 2–2, 3–17, 3–37, 4–5, 4–6, 16–1 to 10–12, 12–1 to 12–10, Oct. 1997.

Moore, M "Z80 Family Interrupt Structure". Barleywood (online), retrieved from the internet <URL: http://www.gaby.de/z80/1653.htm>, 1997.

PCT Search Report based on PCT/US02/16706, 6 pages, Mailed Sep. 27, 2002.

PCT Search Report based on PCT/US02/16705, 7 pages, Mailed Sep. 9, 2002.

PCT Search Report based on PCT/US02/16921, 4 pages, Mailed Oct. 18, 2002.

SPARC, International, Inc., "The SPARC Architecture Manual", Version 8, pp 1–303, 1992.

* cited by examiner

REPEAT INSTRUCTION WITH INTERRUPT

FIELD OF THE INVENTION

The present invention relates to systems and methods for instruction processing and, more particularly, to systems and methods for providing repeat instruction processing capable of repeating an instruction a specified number of times efficiently and with the capability to service one or more interrupts during the repeat instruction processing.

BACKGROUND OF THE INVENTION

Processors, including microprocessors, digital signal processors and microcontrollers, operate by running software programs that are embodied in one or more series of instructions stored in a memory. The processors run the software by fetching the instructions from the series of instructions, decoding the instructions and executing them. The instructions themselves control the order in which the processor fetches and executes the instructions. For example, the order for fetching and executing each instruction may be inherent in the order of the instructions within the series. Alternatively, instructions such as branch instructions, conditional branch instructions, subroutine calls and other flow control instructions may cause instructions to be fetched and executed out of the inherent order of the instruction series.

When a processor fetches and executes instructions in the inherent order of the instruction series, the processor may execute the instructions very efficiently without wasting processor cycles to determine, for example, where the next instruction is. When flow control instructions are processed, one or more processor cycles may be wasted while the processor locates and fetches the next instruction required for execution.

In digital signal processing applications, and other mathematically intensive applications, programs frequently include repetitive operations embodied in repetitive instructions such as the multiply and accumulate (MAC) instruction. Repetitive instructions may be embodied within a program in various ways. For example, an instruction that is to be repeated may be literally repeated within the instruction series the required number of times. However, this is wasteful of program memory space. Alternatively, a conditional branch instruction may be included in an instruction sequence to define a repetitive software loop that includes the instruction for repetition and the number of times for repetition.

Software loops are helpful to keep the size of programs reasonable. However, software loops frequently result in wasted processor cycles while the processor resets it program counter to point from the last to the first instruction in the software loop.

Another technique to realize repeat loops is to provide a repeat instruction for causing a certain instruction to be executed a specified number of times. Repeat instructions have been provided on processors. However, repeat instructions have not conventionally permitted interrupts to be handled during repeat instruction processing thus significantly increasing interrupt latency. Moreover, some repeat instructions have been severely limited in terms of the number of times the instruction may be repeated. In addition, conventional repeat instructions waste processor cycles by continuously refetching the instruction for repetition within the series of instructions.

Accordingly, there is a need for a processor that implements repeat instruction processing in an efficient manner. There is a further need for a processor that implements a repeat instruction that permits the number of repetitions to be specified by the programmer. There is still a further need for repeat instruction processing that may be interrupted to handle exceptions that arise during the repeat instruction execution.

There is a further need for any such interrupts that arise during repeat instruction processing to be handled with a minimum loss in processor cycles and for nested interrupts to be processed during repeat instruction processing if necessary. There is still a further need for repeat loop processing to resume with a minimum loss in processor cycles after an interrupt is processed. There is still a further need to provide a simple solution to repeat instruction processing that minimizes the amount of logic required to implement the solution and thus the amount of space required on the processor to support the solution.

SUMMARY OF THE INVENTION

According to embodiments of the present invention, a processor for processing interruptible repeat instructions is provided. The repeat instruction may include an immediate operand specifying a loop count value corresponding to the number of times that the loop is to be repeated. Alternatively, the repeat instruction may include an address of a register which holds the loop count value. The instruction immediately following the repeat instruction is the target instruction for repetition. The processor includes hardware for repeating execution of the target instruction according to the loop count value in a low processor cycle overhead manner. Embodiments may also include hardware for processing interrupts during repeat instruction processing in a low-overhead manner during the initial call of the interrupt service routine as well as upon returning from the interrupt service routine.

According to one embodiment of the invention, a method of processing an interruptible repeat instruction includes fetching a target instruction for repeated execution and executing the target instruction a predetermined number of times. The method further includes interrupting the execution during a processing exception to load a first instruction from an interrupt service routine into an instruction register for subsequent execution. The first instruction is determined without reference to a program counter.

The method may further include fetching a repeat instruction that determines the target instruction for repeated execution. In addition, the repeat instruction may include a loop count value that determines the predetermined number of times the target instruction is executed. Alternatively, the repeat instruction may include an address specifying a memory location that includes the loop count value. The method may further include setting a repeat flag during repeat instruction processing and resetting the repeat flag after executing the target instruction the predetermined number of times. Repeat instruction processing may also continue after the interrupting when the repeat flag is set.

According to another embodiment of the invention, a processor provides interruptible repeat instruction processing. The processor includes a program memory, a program counter, an execution unit and a loop control unit. The program memory stores instructions including a repeat instruction and a target instruction. The program counter identifies current instructions for processing. The loop control unit executes the repeat instruction to a) store and change a loop count value in a repeat count register and b) prevent an instruction after the target instruction from being fetched until the loop count value reaches or exceeds a predetermined value. The execution unit repeatedly executes the target instruction until the loop count value reaches or exceeds the predetermined value. Notwithstanding the foregoing, the repeated execution of the target instruction may be interrupted during a processing exception to load a first instruction from an interrupt service routine into an instruction register for subsequent execution. Also, the first instruction may be determined without reference to the program counter.

The processor may further include a status register wherein the loop control unit further sets a repeat flag within the status register during repeat instruction processing. The execution unit may also continue repeatedly executing the target instruction after the interrupt is processed/serviced when the repeat flag is set. In addition, the loop control unit may reset the repeat flag after the loop count value reaches or crosses the predetermined value.

The repeat instruction may be executed within an interrupt service routine (ISR) without overhead. In addition, nested interrupts may also execute repeat instructions provided that the repeat loop control register values are stored on the stack.

BRIEF DESCRIPTION OF THE FIGURES

The above described features and advantages of the present invention will be more fully appreciated with reference to the detailed description and appended figures in which.

DETAILED DESCRIPTION

According to embodiments of the present invention, a processor for processing interruptible repeat instructions is provided. The repeat instruction may include an immediate operand specifying a loop count value corresponding to the number of times that the loop is to be repeated. Alternatively, the repeat instruction may include an address of a register which holds the loop count value. The instruction immediately following the repeat instruction is the instruction for repetition. The processor includes hardware for repeating execution of the instruction for repetition according to the loop count value in a low processor cycle overhead manner. It also may include hardware for processing interrupts during repeat instruction processing in a low-overhead manner.

Figure 1:
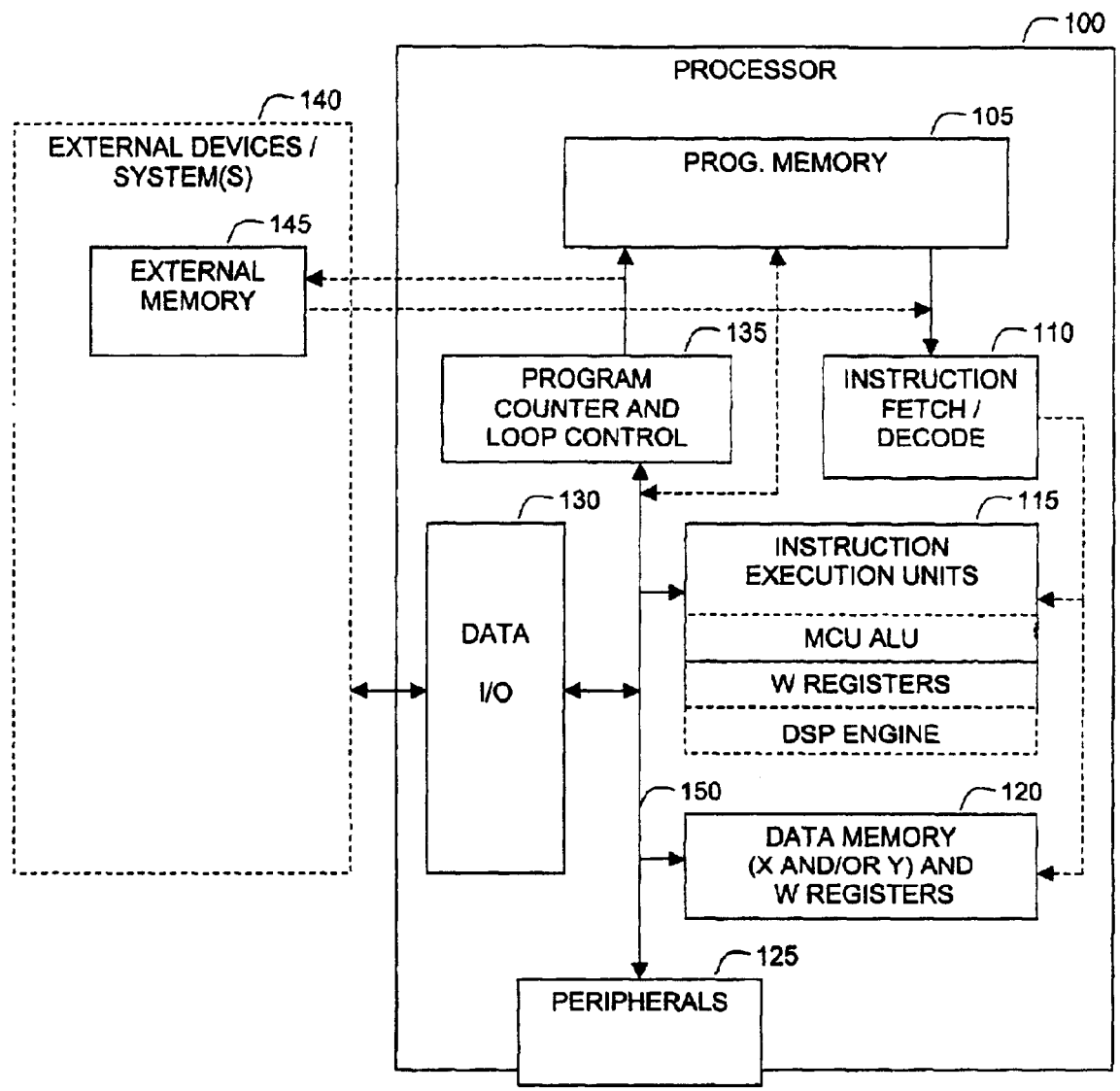
FIG. 1 depicts a functional block diagram of an embodiment of a processor chip within which embodiments of the present invention may find application.
Figure 2:
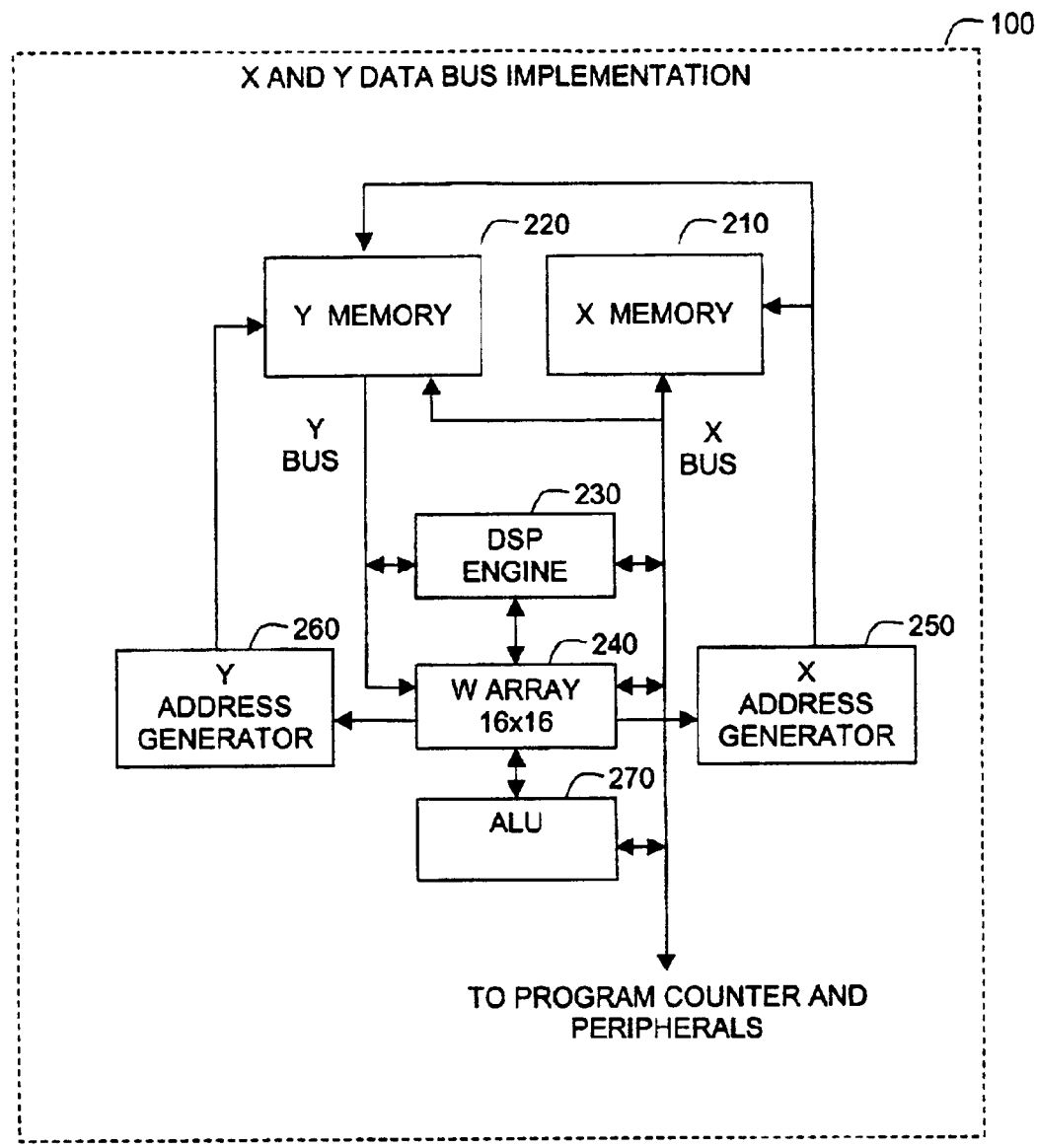
FIG. 2 depicts a functional block diagram of a data busing scheme for use in a processor, which has a microcontroller and a digital signal processing engine, within which embodiments of the present invention may find application.

In order to describe embodiments of repeat instruction processing, an overview of pertinent processor elements is first presented with reference to FIGS. 1 and 2. The interruptible repeat instruction functionality and interrupt processing is then described more particularly with reference to FIGS. 3–6B.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of non-volatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 125. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

| Q1: | Fetch Instruction |
|---|---|
| Q2: | Fetch Instruction |
| Q3: | Fetch Instruction |
| Q4: | Latch Instruction into prefetch register, Increment PC |

The following sequence of events may comprise, for example, the execute instruction cycle for a single operand instruction:

| Q1: | latch instruction into IR, decode and determine addresses of operand data |
|---|---|
| Q2: | fetch operand |
| Q3: | execute function specified by instruction and calculate destination address for data |
| Q4: | write result to destination |

The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

| Q1: | latch instruction into IR, decode and determine addresses of operand data |
|---|---|
| Q2: | pre-fetch operands into specified registers, execute operation in instruction |
| Q3: | execute operation in instruction, calculate destination address for data |
| Q4: | complete execution, write result to destination |

Repeat Instruction Processing

Figure 3:
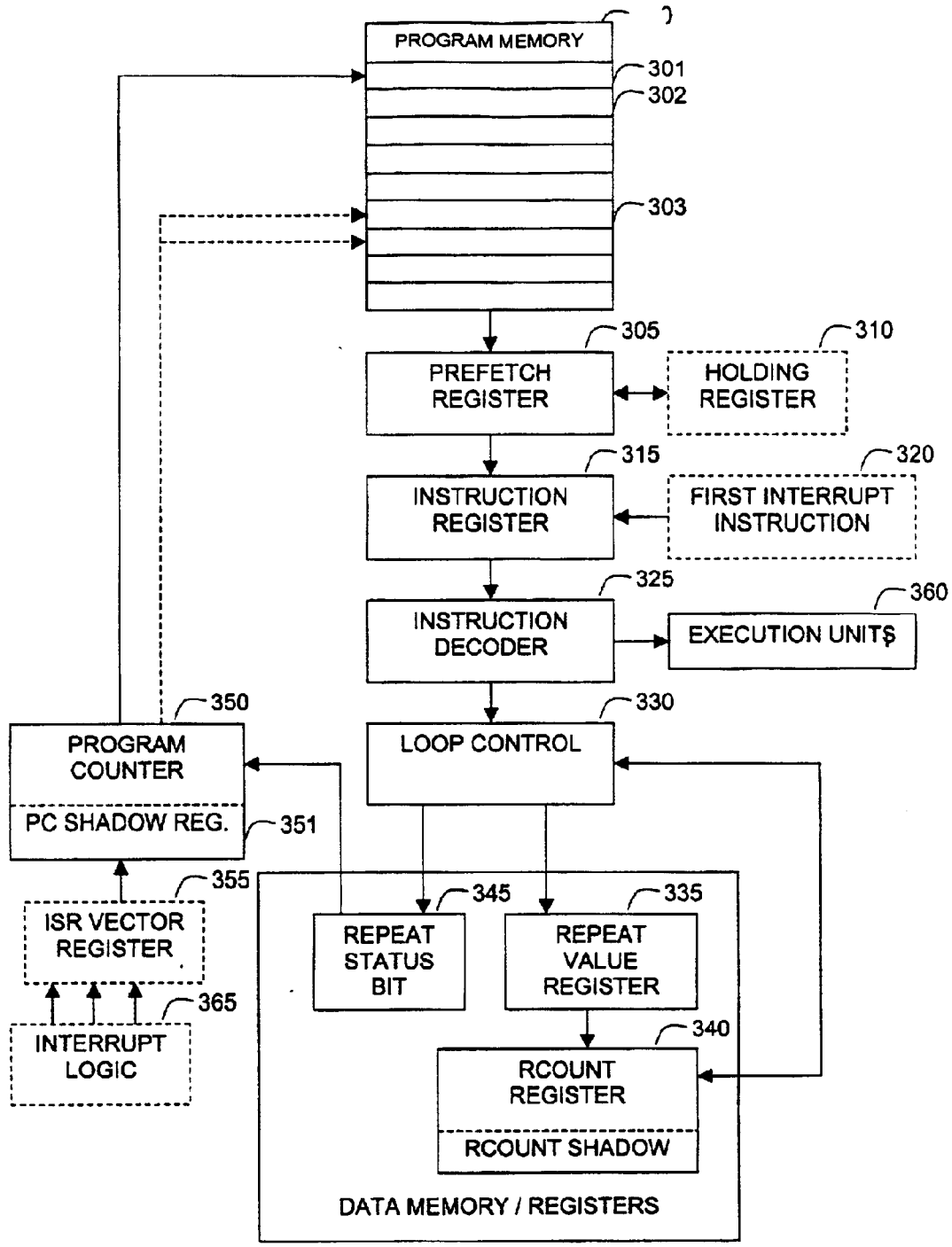
FIG. 3 depicts a functional block diagram of a processor configuration for processing an interruptible repeat according to an embodiment of the present invention.

FIG. 3 depicts a functional block diagram of a configuration for processing an interruptible repeat instruction according to an embodiment of the present invention.

Referring to FIG. 3, the program memory 300 stores program instructions for execution. The program memory 300 includes a repeat instruction, 301, followed by a target instruction 302 for repetition. The repeat instruction may follow the target instruction if a register is implemented to hold instructions after their execution. A prefetch register 305 fetches the next instruction for execution based on the instruction within the program memory pointed to by the program counter (PC) 350. The instruction register 315 stores the current instruction that the processor is executing. The instruction register may be loaded during Q1 with the instruction from the prefetch register 305 fetched in the previous cycle. The instruction decoder 325 decodes the instruction and provides the decoded instruction and operand addresses to the appropriate execution unit 360. The appropriate execution unit may be, for example, the ALU 270 or the DSP engine 230.

In the case of a repeat instruction, the decoder may provide the decoded instruction and any operand addresses to the loop control unit 330. There are two main types of REPEAT instruction that may be implemented. The first is a REPEAT instruction where the number of iterations for the loop is specified as a loop count value in an immediate operand within the REPEAT instruction itself. The number of bits allocated for the loop count value determines how large the loop count value may be. The second type of REPEAT instruction is a REPEAT W instruction where W stands for W register. According to the REPEAT W instruction, the instruction specifies a W register by including its address within the instruction. The specified W register stores the loop count value for the repeat loop.

The loop control unit 330 executes the REPEAT and REPEAT W instructions (and REPEAT W) when decoded by the decode 325. Specifically, the loop control unit 330 recognizes the REPEAT instruction and sends a control signal to the program counter 350 causing the PC not to increment for all subsequent iterations of the instruction to be repeated until the last one is encountered. In addition, the program fetch control is also inhibited during this time, freeing up the program memory for data access during these cycles. Accordingly, the PC points to the target instruction 302 following the REPEAT instruction during this time.

The loop control unit 330 further sets a repeat status bit 345 which may be one of many bits within a larger status register for the processor. The repeat status bit indicates that the processor is processing a repeat instruction. The repeat status bit is an input to the program counter and inhibits the incrementing of the program counter and the fetching of instructions when set. The status bit may also be read automatically or otherwise during an interrupt service routine so that program flow control, upon returning from an interrupt service routine, is determined by the loop control unit 330 to resume execution of the repeat loop.

The loop control unit 330 stores the loop control value into the RCOUNT register 340. When the REPEAT instruction includes the loop control value as an immediate operand, the loop control value is written directly into the RCOUNT register 340. When the REPEAT W instruction is used, the loop control value is written from the repeat value register 335, specified by the address in the REPEAT W instruction into the RCOUNT register 340.

When the processor executes the REPEAT instruction for the first time, the instruction following the REPEAT instruction is stored into the prefetch register 305. This instruction is the target instruction 302 which will be repeated. Upon the next processor cycle, the REPEAT status bit (now set) prevents the program counter 350 from incrementing and prevents an instruction fetch from program memory from occurring. Consequently, the pre-fetch register 305 is not overwritten. The instruction register 315 is therefore repeatedly loaded with the contents of the pre-fetch register 305 during each subsequent iteration of the repeat loop.

To test whether the appropriate number of loops have been made, the loop control unit 330 decrements the RCOUNT register and compares its value with a predetermined value which may be, for ex., 0. When the RCOUNT reaches this value, then the loop control unit clears the repeat status bit which will allow the program counter 350 to increment during the last repeat loop iteration. Normal instruction processing resumes for all subsequently fetched instructions. If RCOUNT≠ the predetermined value, then the target instruction is repeated again and the repeat loop remains active until RCOUNT=0. It will be understood that any logical operation may be used to test whether the loop is finished. For example, RCOUNT may be incremented instead of decremented and in either case the incrementing/decrementing may be made prior to or after the comparison with a predetermined value. In addition, the predetermined value may be a value other than 0.

At any time during the processing of the repeat instruction, an interrupt may occur and be taken. In order to preserve the target instruction 302 while the interrupt is serviced, the target instruction from the prefetch register 305 may be stored in a holding register 310. The holding register may hold a single value only. Alternatively, the holding register may hold a stack of values thus permitting nested interrupts to be serviced. This hardware last in first out (LIFO) stack would permit nested interrupts to execute REPEAT instructions within their respective ISR, without the need to save and retrieve the contents of the instruction prefetch register 305.

To speed processing of an interrupt service routine, the first interrupt instruction 303 from an interrupt service routine (ISR) may be stored in register 320 and loaded into the instruction register 315 automatically upon detection of the interrupt. This allows the processor 100 to immediately decode and execute the first instruction of the ISR. Simultaneously, PC is saved in the PC shadow register 351, status register (SR) is saved in the SR shadow register, and RCOUNT is saved in the RCOUNT shadow register, and the ISR Vector Register may update the program counter with the address of the second instruction of the ISR. This forces the prefetch register to fetch the second instruction of the ISR while the first instruction is executing. The PC shadow register may hold a single value only. Alternatively, the PC shadow register may hold a stack of values for nested interrupts. The same is true for the RCOUNT shadow register. These measures allow interrupts to be serviced during repeat instruction processing and reduce or eliminate dormant instruction cycles during servicing interrupts.

After an interrupt is serviced, the target instruction 302 from the holding register 310 may be restored to the prefetch register 305 thus permitting repetition of the target instruction to resume. This also reduces or eliminates dormant instruction cycles because the target instruction 302 is restored without the processor having to first reset the PC to read the target instruction from the program memory.

Figure 4:
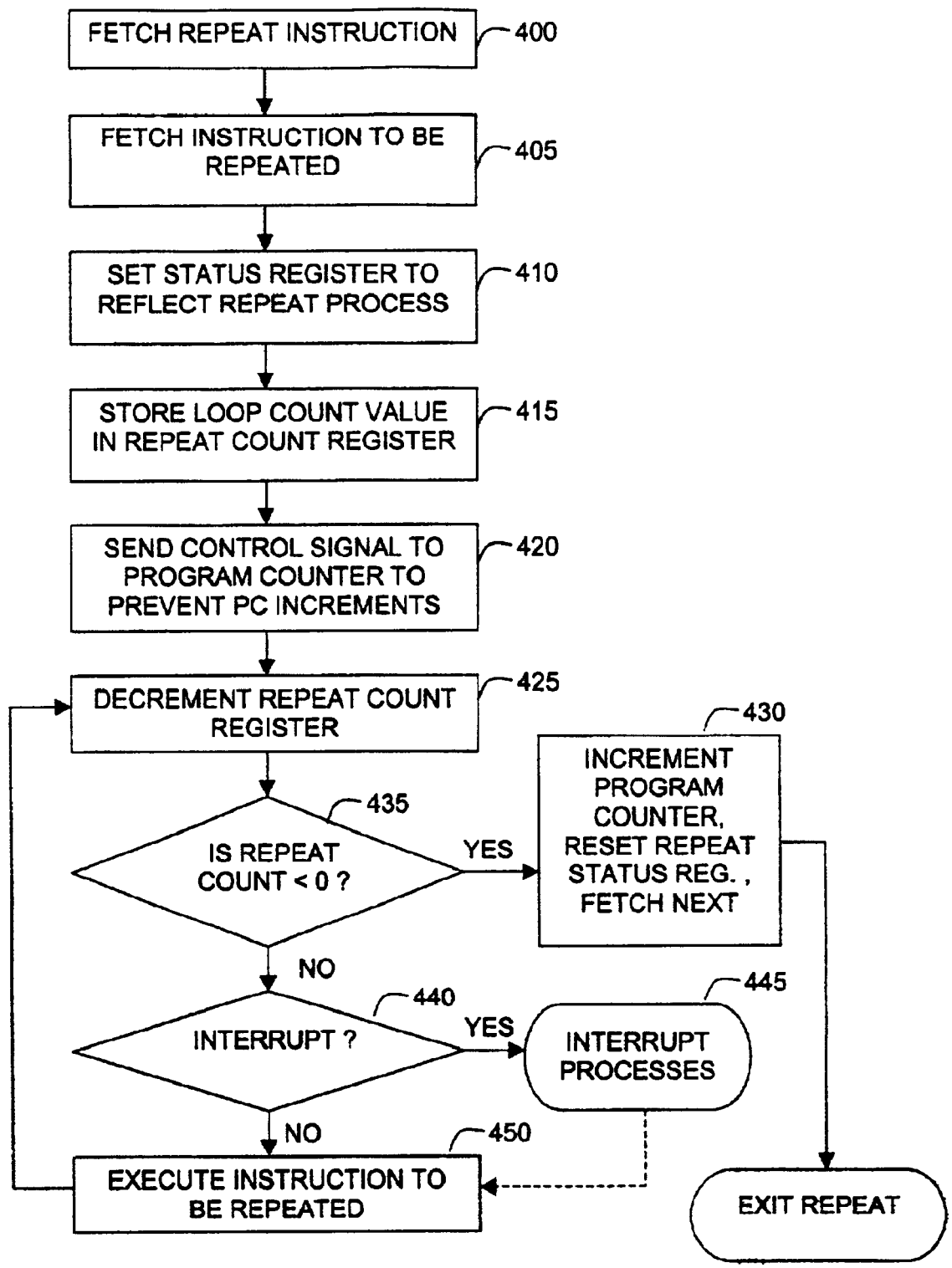
FIG. 4 depicts a method of processing an interruptible repeat instruction according to an embodiment of the present invention.

FIG. 4 depicts a method of processing an interruptible repeat instruction according to an embodiment of the present invention. Referring to FIG. 4, in step 400, the processor fetches a repeat instruction. Then in step 405, the processor 100 fetches the target instruction for repetition. In step 410, the processor sets the status register to reflect on-going repeat instruction processes. In step 415, the processor stores a loop count value into a repeat count register. The processor may obtain the loop count value directly from immediate data within the repeat instruction or from a register or other memory location. In the latter scenario, the repeat instruction itself may specify the address of the register or memory location that includes the loop count value.

In step 420, the processor sends a control signal to the program counter 350 to prevent the PC from incrementing.

Then in step 425, the processor decrements the repeat count register 340. In step 425, the processor determines whether or not the repeat count register 340 is less than zero. If so, then the repeat loop has finished. Accordingly, in step 430, the processor increments the program counter, resets the repeat status register 345 and fetches the next instruction. If not, then step 440 begins. In step 440, if there is an interrupt, the processor processes the interrupt in step 445. If there is not an interrupt, then the processor executes the instruction to be repeated in step 450. Subsequently, step 425 begins again. In this manner, the procedure provides and efficiently low overhead interruptible repeat instruction processing capability.

Figure 5:
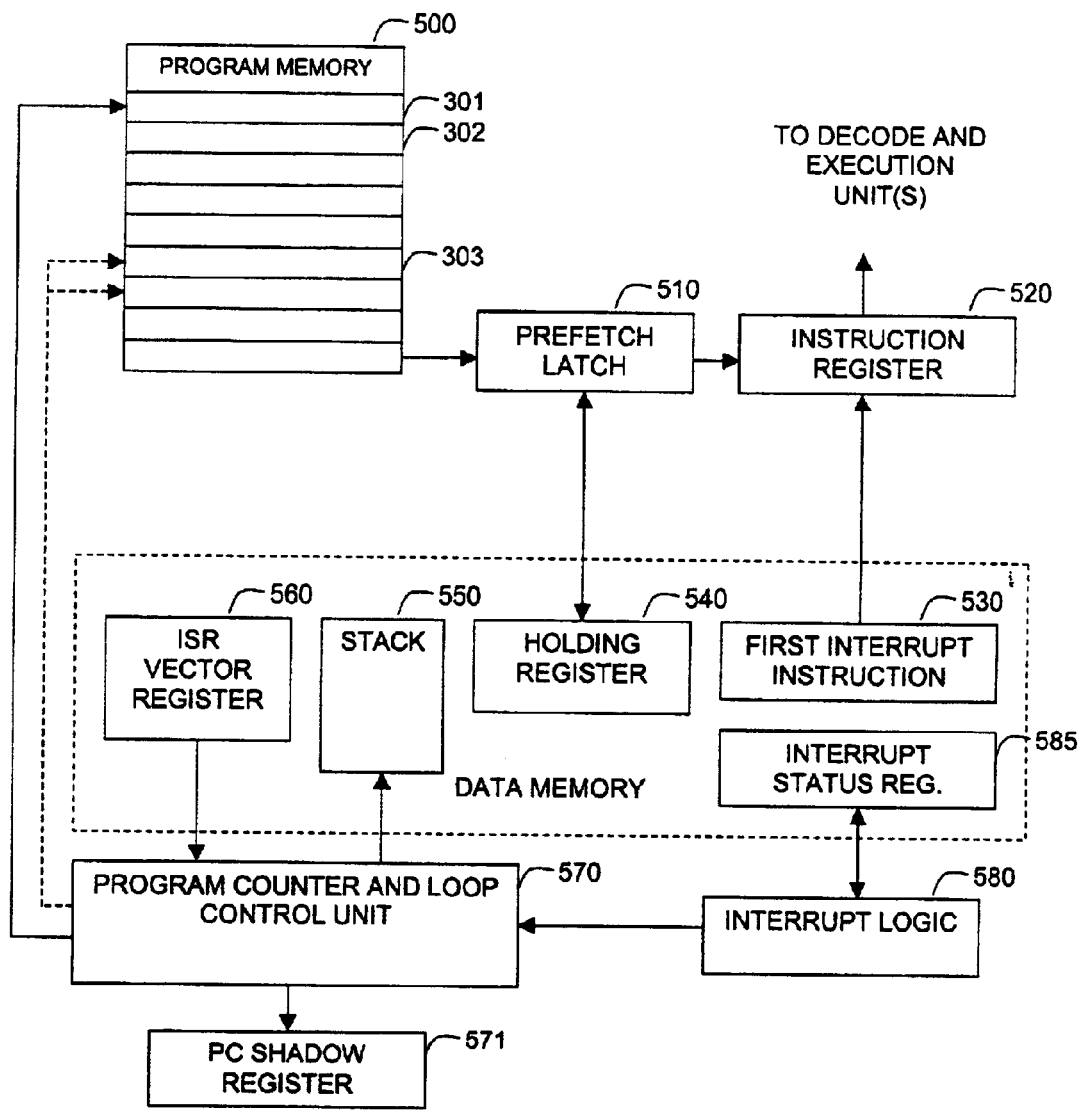
FIG. 5 depicts a functional block diagram of a processor configuration for implementing a low over-head interrupt according to an embodiment of the present invention.

FIG. 5 depicts a functional block diagram of logic and registers for implementing a low overhead interrupt according to an embodiment of the present invention. Referring to FIG. 5, a prefetch latch 510 is coupled to the program memory 500, an instruction register 520 and a holding register 540. The prefetch latch 510 holds the instruction fetched from program memory 500 at the location specified by the program counter (PC) 570. The instruction register 520 receives the instruction from the prefetch latch 510 upon the beginning of Q1 of the next instruction cycle. The holding register 540 receives and stores the value in the prefetch latch 510 when an interrupt is taken. The PC shadow register 571 receives and stores the contents of the PC when an interrupt is taken. The SR shadow register receives and stores the contents of the status register.

The instruction stored in the instruction register 520 is decoded and provided to the execution units as indicated in FIG. 5. When an interrupt is taken and to speed processing of the interrupt service routine (ISR), the first interrupt instruction from the ISR may be transferred from the first interrupt instruction register 530 to the instruction register 520. In addition, the PC is transferred to the PC shadow register and the status register to the SR shadow register. This is called a fast interrupt, permits the ISR to begin execution immediately, without having to wait for the processor 100 to fetch the first ISR instruction by first changing the program counter 570. This functionality is referred to as a fast interrupt processing or low overhead interrupt processing.

The program counter 570 typically increments during sequential instruction flow. It may also include loop control functionality for implementing repeat instruction processing according to embodiments of the present invention. It may also include logic for processing branch and other flow control instructions. The interrupt logic 580 reads various inputs to determine whether an exception to normal instruction processing has occurred and whether the exception should trigger an interrupt of the normal instruction flow. There are many conditions that may trigger an interrupt including, for example, a processor reset, an oscillator fail condition, a stack overflow condition, an address error condition, an illegal instruction condition, an arithmetic error condition and various priority interrupts for giving effect to various input/output, program or other processes. A processor reset, however, will not result in saving the status of a repeat instruction.

Figure 6A:
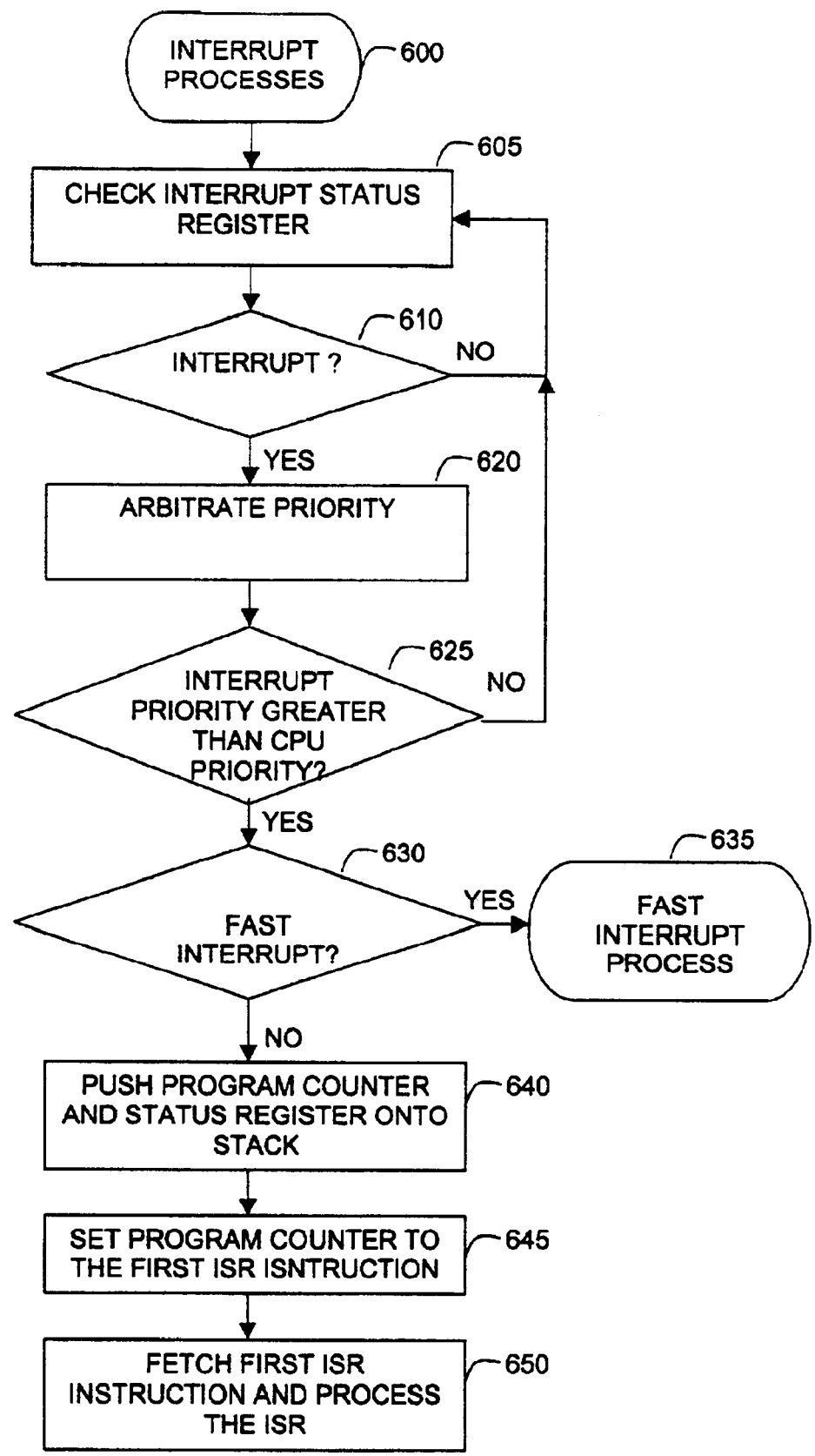
FIGS. 6A and 6B depict a method of processing an interrupt in an efficient manner according to an embodiment of the present invention.
Figure 6B:
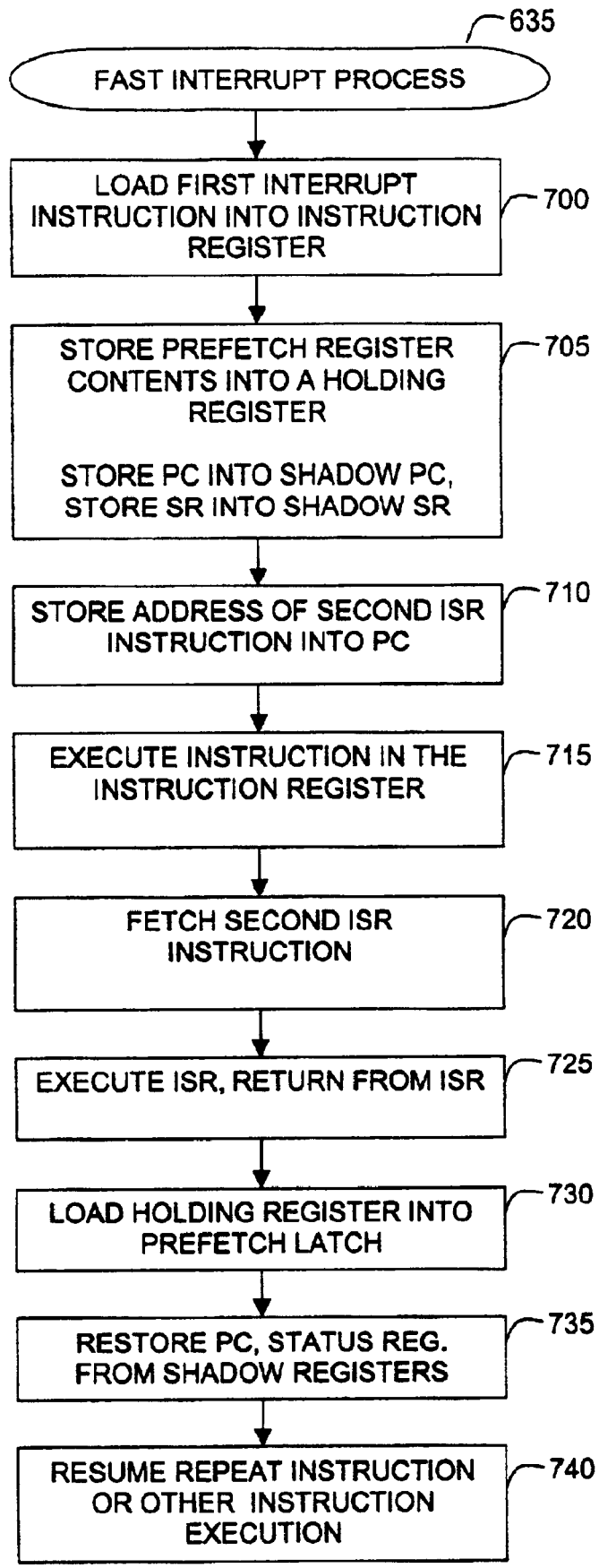

The interrupt logic 580 determines the presence of an interrupt and whether or not to process the interrupt based on the methods shown in FIGS. 5, 6A and 6B. If the interrupt logic 580 determines that an interrupt is to be taken, then the interrupt logic causes: a) the value in the prefetch latch 510 to be stored into the holding register 540 and b) if the interrupt is designated to be a fast interrupt, the first interrupt instruction to be loaded from the first interrupt instruction register 530 to the instruction register 520. The program counter 570 also loads into the program counter 570 the address of the first or second instruction of the ISR from the ISR vector register 560 depending on whether the interrupt is a fast interrupt or a regular interrupt. If the interrupt is a fast interrupt, the PC is also transferred into the PC shadow register. If the interrupt is not a fast interrupt, the interrupt logic 580 also causes the program counter 570 and the status register to be stored on the stack 550 prior to incrementing the program counter.

In this manner, the ISR interrupts the normal instruction execution and takes over execution for the duration of the ISR. When the ISR is finished, the program counter and the status register are restored from the stack or the shadow register, depending on the interrupt type. Program processing resumes where it left off. Moreover, in the case of a fast interrupt, to speed the process of resuming processing, the next instruction for execution is restored from the holding register 540 into the prefetch latch 510 without requiring the next instruction to be fetched first from program memory based on the program counter 570. This eliminates wasted processor cycles. While the instruction from the holding register 540 is executing, the next instruction is fetched from the program memory based on a program counter value restored from the shadow register.

FIG. 6A depicts a method of performing interrupt processes 600 in an efficient manner according to an embodiment of the present invention. Referring to FIG. 6A, in step 605, the processor checks an interrupt status register to determine if there has been an interrupt. If the status register indicates that there has been no interrupt in step 610, then step 605 begins again. If the status register indicates that there has been an interrupt, then step 620 begins. In step 620, the processor arbitrates priority to determine the interrupt with the highest priority. This step is provided because there may be more than one interrupt with different priority levels at any given time. Then in step 625, the interrupt logic determines whether the interrupt with the highest priority has a priority level which exceeds that of the CPU priority. This step in essence determines whether the interrupt pending is more important than the process that the processor is currently running. If not, then step 605 begins again and the interrupt is not serviced. If so, then step 630 begins.

In step 630 the processor determines whether the interrupt is a fast interrupt or a regular interrupt. This step may be performed by comparing an interrupt identifier with a list of those interrupts specified as fast interrupts. Fast interrupts take advantage of the registers 530–560 to speed launch into the ISR and return from the ISR. Regular interrupts do not take advantage of these registers. All interrupts use the stack 550. The processor may select one interrupt as a fast interrupt. In addition, the processor should store the following information for the interrupt specified as a fast interrupt: a) the first instruction of the ISR into the first interrupt instruction register 530, b) the address of the second ISR instruction into the ISR vector register. The values represented in a) and b) may be retrieved from memory based on the type of fast interrupt being serviced.

If a fast interrupt occurs, then step 635 begins which is illustrated in FIG. 6B. If a fast interrupt does not occur, then a regular interrupt is processed according to steps 640 and 645 shown in FIG. 6A. In step 640 the processor pushes the program counter and status register onto the stack. Then in step 645, the processor loads the address of the first instruction in the ISR into the program counter 570. Then in step 650, prefetch latch fetches the first ISR instruction with attendant delay and executes the ISR. At the end of the ISR, the program counter and status register are restored from the stack and regular instruction processing resumes.

When a fast interrupt is determined to have caused an interrupt, then the fast interrupt processes 635 begin as depicted in FIG. 6B. Referring to FIG. 6B, in step 700 the processor interrupt logic 580 loads the first interrupt instruction from the first interrupt instruction register 530 into the instruction register 520. Then in step 705, the processor causes the prefetch latch 510 to store the next instruction for regular execution into the holding register 540. The processor also causes the program counter 570 to be stored in the program counter shadow register 571 and the status register to be stored in the shadow register for the status register. In step 710, the address of the second ISR instruction is loaded from the ISR vector register into the program counter.

In step 715, the processor executes the instruction from the instruction register which is the first instruction of the ISR. This process occurs without loss of processing cycles associated with fetch fetching the instruction based on the program counter. At the same time, in step 720, the processor fetches second ISR instruction into the prefetch latch 510 from the program memory based on the program counter 570. In step 725, the program counter is incremented as the instructions within the ISR are fetched and executed. At the end of the ISR, the interrupt logic causes a return from servicing the ISR.

In step 730, upon return from the ISR, the processor causes the instruction stored in the holding register 540 to be restored to the prefetch latch 510. This is the instruction that was about to be executed prior to the interrupt. Then in step 735, the value of the program counter prior to the interrupt is restored from the stack 550 or the shadow register into the program counter 570. The value of the status register prior to the interrupt is also restored from the stack into the status register.

In step 740, the processor executes the next instruction of the program flow prior to the ISR. The next instruction may be a repeat instruction or other instruction stored within prefetch latch 510 upon resuming normal program execution. The execution resumes without wasted processor cycles because the next instruction for execution is placed directly into the prefetch latch from the holding register for execution in the next processor cycle. If this were not the case execution would be delayed for at least one processor cycle while the processor fetched the next instruction from memory based on the restored program counter.

While specific embodiments of the present invention have been illustrated and described, it will be understood by those having ordinary skill in the art that changes may be made to those embodiments without departing from the spirit and scope of the invention.

What is claimed is:

1. A method of processing an interruptible repeat instruction, comprising:

setting a repeat flag;

fetching a target instruction for repeated execution;

executing the target instruction a predetermined number of times;

interrupting the executing during a processing exception to load a first instruction from an interrupt service routine into an instruction register for subsequent execution, the first instruction being determined without reference to a program counter; and continuing the executing after the interrupting when the repeat flag is set without re-fetching the target instruction.

2. The method according to claim 1, further comprising:

fetching a repeat instruction that determines the target instruction for repeated execution.

3. The method according to claim 2, wherein the repeat instruction includes a loop count value that determines the predetermined number of times the target instruction is executed.

4. The method according to claim 2, wherein the repeat instruction includes an address specifying a memory location that includes a loop count value for determining the predetermined number of times the target instruction is executed.

5. The method according to claim 1, further comprising resetting the repeat flag after executing the target instruction the predetermined number of times.

6. A processor including interruptible repeat instruction processing, comprising:

a program memory for storing instructions including a repeat instruction and a target instruction;

a program counter for identifying current instructions for processing;

a loop control unit for executing the repeat instruction to a) store and change a loop count value in a repeat count register and b) prevent an instruction after the target instruction from being fetched until the loop count value reaches or exceeds a predetermined value; and an execution unit for repeatedly executing the target instruction until the loop count value reaches or crosses the predetermined value;

wherein the executing is able to be interrupted during a processing exception to load a first instruction from an interrupt service routine into an instruction register for subsequent execution, the first instruction being determined without reference to a program counter.

7. The processor according to claim 6, wherein the repeat instruction itself includes the loop count value.

8. The processor according to claim 6, wherein the repeat instruction includes an address specifying a memory location that includes the loop count value.

9. The processor according to claim 7, further comprising:

a status register;

wherein the loop unit further sets a repeat flag within the status register during repeat instruction processing.

10. The processor according to claim 9, wherein the execution unit continues to repeatedly execute the target instruction after the interrupt when the repeat flag is set.

11. The processor according to claim 9, wherein the loop control unit resets the repeat flag after the loop count value reaches the predetermined value.

12. The processor according to claim 6, wherein the loop control unit changes the loop count value by decrementing it.

13. The processor according to claim 6, wherein the loop control unit changes the loop count value by incrementing it.

14. The processor according to claim 6, wherein the predetermined value is zero.

15. The processor according to claim 6, wherein the predetermined value is not zero.

* * * * *